United States Patent
Faist et al.

[11] Patent Number: 6,088,502
[45] Date of Patent: Jul. 11, 2000

[54] PROTECTIVE CLOSURE PART FOR OPTO-ELECTRICAL MODULE

[75] Inventors: Eugen Faist; Helmut Bruch; Christian Sieber, all of Berlin, Germany

[73] Assignee: Siemens Aktiengesellschaft, Munich, Germany

[21] Appl. No.: 09/093,571

[22] Filed: Jun. 8, 1998

Related U.S. Application Data

[63] Continuation of application No. PCT/DE96/02377, Dec. 4, 1996.

[30] Foreign Application Priority Data

Dec. 8, 1995 [DE] Germany ............................ 195 47 523

[51] Int. Cl.[7] ........................................................ G02B 6/42
[52] U.S. Cl. ................................................ 385/134; 385/94
[58] Field of Search ................................ 385/88–94, 134

[56] References Cited

U.S. PATENT DOCUMENTS

| 4,105,285 | 8/1978 | Bedgood et al. ...................... 385/63 |
| 4,640,575 | 2/1987 | Dumas ..................................... 385/134 |
| 5,163,109 | 11/1992 | Okugawa et al. ..................... 385/94 |
| 5,243,678 | 9/1993 | Schaffer et al. ....................... 385/134 |
| 5,395,360 | 3/1995 | Manoukian ............................ 606/15 |
| 5,647,044 | 7/1997 | Basavanhally et al. ............... 385/92 |
| 5,684,903 | 11/1997 | Kyomasu et al. ..................... 385/93 |

FOREIGN PATENT DOCUMENTS

| 0 312 147 A2 | 4/1989 | European Pat. Off. . |
| 2 331 804 | 6/1977 | France . |
| 265 242 A1 | 2/1989 | Germany ................................ 385/94 |
| 39 25 535 C1 | 1/1991 | Germany . |

*Primary Examiner*—John D. Lee
*Attorney, Agent, or Firm*—Herbert L. Lerner; Laurence A. Greenberg; Werner H. Stemer

[57] ABSTRACT

A closure part for the liquid and dirt-sealed closure of a coupling socket for optical waveguides carries a central sealing element and a sleeve coaxially surrounding the sealing element. The sealing element includes an end surface having a bevel with a surface area adapted to an edging on an end surface of the coupling socket. The sealing element is pressed against the socket and seals the socket by suitable pressure. The sleeve grips in a firmly adhering manner around an outer lateral surface of the socket, fixes the closure part in an SC receptacle and seals the socket from the outside.

10 Claims, 4 Drawing Sheets

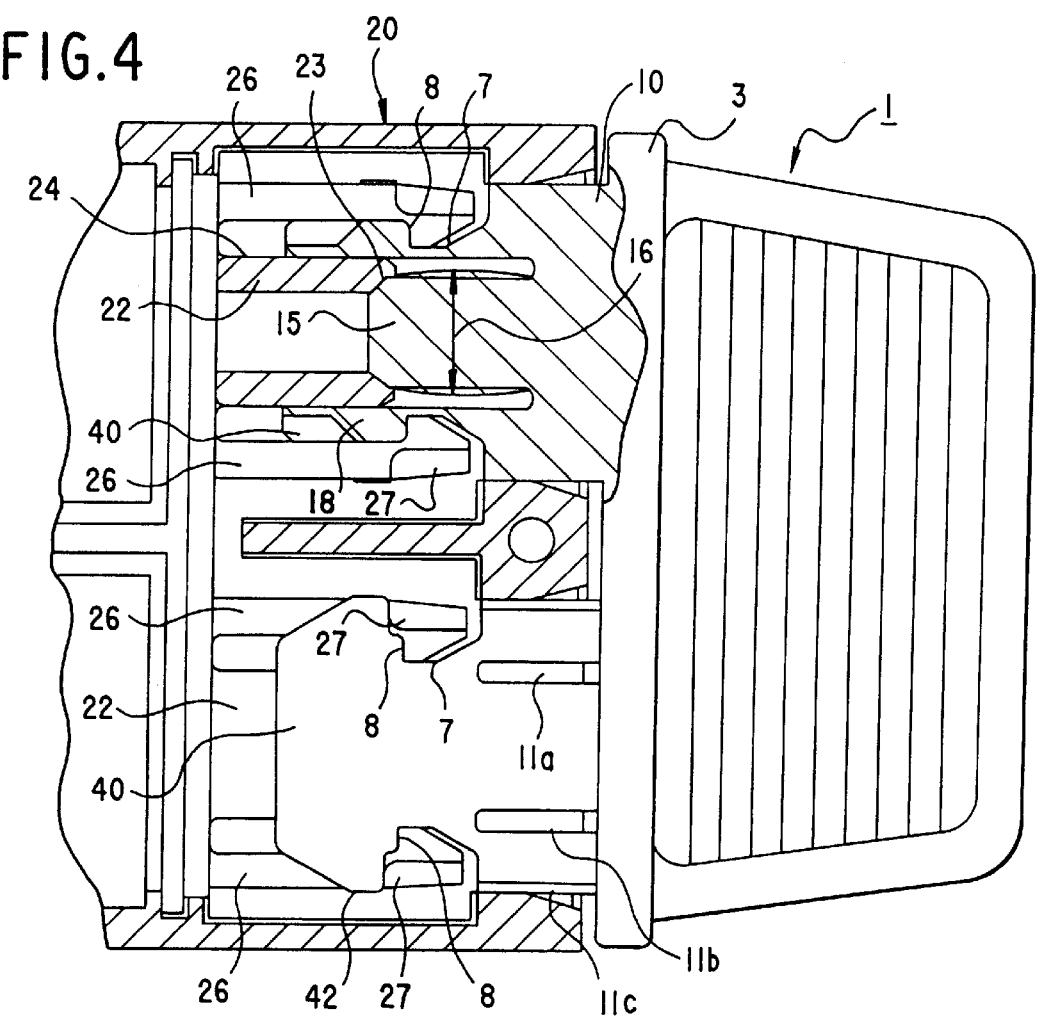
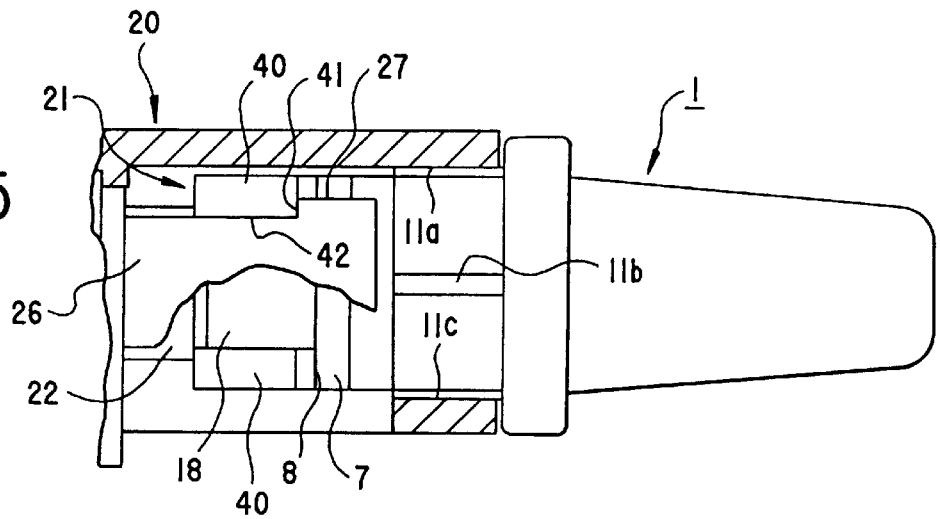

PROTECTIVE CLOSURE PART FOR OPTO-ELECTRICAL MODULE

CROSS-REFERENCE TO RELATED APPLICATION

This application is a continuation of International Application No. PCT/DE96/02377, filed Dec. 4, 1996, which designated the United States.

BACKGROUND OF THE INVENTION

FIELD OF THE INVENTION

The invention relates to a closure part with a sleeve which is constructed for receiving an optical coupling socket and snugly enclosing an outer surface of the socket.

Suitable closure parts are used for reliably closing the receiving sockets for optical waveguides on electrooptical modules from the production process up until when the module is put into operation. In such cases, the closure parts are intended to seal the receiving sockets against dirt and water and retain a reliable and defined functional position. In addition, self-contamination of the receiving socket caused by the wearing of the closure part should be ruled out and the running off of liquid during testing for major leaks and cleaning of the module should be made possible.

A protective connector for closing an electrooptical module is described in U.S. Pat. No. 5,243,678. Attached to a grip is a covering flange, which carries at least one parallel alignment pylon. The end surface of the alignment pylon is adapted to depressions of an optically active component. The alignment pylon is surrounded by a collar, which is attached to the covering flange and carries pressing webs on its outer side. The alignment pylon completely penetrates a receiving socket of the electrooptical module in an inserted state. A receptacle of the module in which the receiving socket is located then encloses the collar of the protective connector, with the protective connector being fixed in the receptacle by the pressing webs. The covering flange completely seals the receptacle at the end surface. The alignment pylon projects out of the back end of the receiving socket and aligns an optically active component with its end surface. That provisional alignment takes place in order to be able to fasten the optically active component permanently in the module in an aligned manner. Furthermore, the protective connector is intended to protect the optically active component and the receiving socket against contamination. However, the protective connector cannot prevent self-contamination, since it passes through the receiving socket up to the optically active component. Similarly, protection against water is only inadequately ensured.

A protective cap for optical waveguide plug-in connections is described in Published European Patent Application 0 312 147A2. The protective cap offers connecting surfaces, for a coupling part and a connector, on both sides of an intermediate body. In that case, the connecting surfaces are provided axially opposite one another and make it possible for the coupling part and the connector to be received simultaneously. The protective cap essentially only prevents the depositing of dust on the sensitive end surface of the optical waveguide in the connector or in the coupling. The protective cap is not watertight.

A closure part of the type stated at the outset above is described in U.S. Pat. No. 4,640,575 in the form of a protective cap for a socket for receiving optical waveguides. The socket is fastened on a base plate. The protective cap, which is resiliently mounted, is likewise attached to the base plate at the side of the socket. Whenever the socket is not connected to a connector, the protective cap, which is formed of an elastic material, covers the socket, acting as a shroud around it on the outside against dust. If an optical waveguide connector is removed from the socket, the protective cap snaps over the socket and covers it. The protective cap can be pressed firmly onto the socket by additional axial force. The protective cap is unsuitable for electrooptical modules with receptacles and does not guarantee adequate protection against moisture.

SUMMARY OF THE INVENTION

It is accordingly an object of the invention to provide a closure part, which overcomes the hereinafore-mentioned disadvantages of the heretofore-known devices of this general type, which seals a receiving socket for optical waveguides on electrooptical modules against dirt and water, retains a reliable and defined functional position, rules out self-contamination and makes it possible for liquid to run off during testing for major leaks and cleaning of the module.

With the foregoing and other objects in view there is provided, in accordance with the invention, a closure part, comprising a sleeve-shaped part for receiving an optical coupling socket and for snugly enclosing an outer surface of the socket; and a central sealing element disposed coaxially in the sleeve-shaped part, the sealing element having an end surface with a bevel for producing a surface-area sealing contact with an end surface of the socket facing the sealing element; and the sleeve-shaped part protruding beyond the end surface of the sealing element.

According to the invention, in the joined-together state of the closure part and the module the sealing element interacts in a sealing manner with the edging on the end surface and the sleeve interacts in a sealing manner with the outer lateral surface of the receiving socket. The way in which the surface area of the bevel of the sealing element hugs the edging on the end surface of the coupling socket reliably protects the latter against liquids and dirt in an advantageous way. Since the sealing element does not reach into the socket, the latter also cannot be contaminated by dirt particles adhering to the sealing element.

In addition to this, the sleeve guarantees a pre-guiding of the closure part axially with respect to the coupling socket and ensures a reliable functional position of the closure part. The tight fit of the sleeve, bearing against the outer lateral surface of the socket in close contact with it, serves on one hand for sealing and on the other hand for firmly pressing the sealing element against the socket. In the case of sleeves having an elastic structure, an advantageous adaptation of the inside diameter of the sleeve to the outside diameter of the lateral surface of the socket leads to an enlargement of the cross-section in the fitted-on state. During fitting onto the socket, the sleeve is slightly compressed and is consequently slightly enlarged in cross-section. Due to the enlargement of the cross-section, the sleeve is pressed radially onto the lateral surface of the socket and a desired adhering and sealing effect is achieved in the fitted-on state. Conversely, when the sleeve is pulled off, over-stretching causes a reduction of the cross-section, which imparts a certain additional adhesive effect. However, the adaptation of the diameters with respect to one another is to be chosen in such a way that the pulling off of the sleeve can take place with a reasonable expenditure of force and without material-fatiguing loading.

In accordance with another feature of the invention, the sealing element is produced from soft plastic as a sealing stopper. In this case the external diameter of the stopper is greater than the internal diameter of the socket, with the result that the bevel of the stopper touches the edging on the end surface of the socket. The stopper is pressed against the coupling socket by axial pressure. The sleeve radially encloses the stopper, but ensures adequate space for a radial expansion of the stopper as a result of the axial pressure.

According to an advantageous embodiment, the sleeve has at least one sealing region, which firmly surrounds the outer peripheral edging of the coupling socket and reliably protects it against dust and moisture. The two-surface sealing of the coupling socket, caused by the sealing element at the edging on the end surface, and by the sleeve at the outer peripheral edging of the coupling socket, which is shaped as a receiving socket for an insert pin carrying an optical waveguide, guarantees particularly effective protection.

In accordance with a further feature of the invention, the closure part has a particularly simple structure and is produced as one part from a suitable soft and elastic plastic.

The sleeve and the sealing element can consequently protect the coupling socket advantageously and effectively. A multi-part embodiment of the closure part is likewise possible. In this case the sealing element is produced from a more elastic plastic than the basic body. The sleeve may likewise be produced from an elastic plastic, but a firmer material is preferred.

In accordance with an added feature of the invention, the sleeve carries a sealing device attached on the inside, which also permits a more favorable sealing effect for better fixing of the closure part. A particularly preferred material is silicone rubber, which is commercially available, for example from the Bayer company under the trademark SILOPREN.

In accordance with an additional feature of the invention, the basic body carries clamping ribs in its rear region, adjoining a stop flange. The ribs serve for the further fixing and alignment of the closure part. At the same time, hollow spaces formed by the clamping ribs and the receptacle and aligned with respect to the longitudinal axis of the closure part allow the flowing away of liquid which has penetrated into the receptacle. During cleaning of the module or testing for major leaks, penetration of cleaning liquid into the receptacle is not completely prevented. However, the closure part according to the invention guarantees reliable protection of the coupling socket against liquid and dust and, in a particularly advantageous way, allows the flowing away of liquid which has penetrated into the receptacle.

In accordance with yet another feature of the invention, the arresting of the closure part on an electrooptical module may also take place in an advantageous way by abutment of latching surfaces of latching arms on the module in suitable receiving surfaces on the closure part. The receiving surfaces on the closure part may be located on the sleeve as well as on a basic body. The sleeve is advantageously constructed in such a way that it has depressions for receiving the latching arms.

In accordance with a concomitant feature of the invention, there are provided arresting surfaces on the closure part representing an additional and consequently particularly effective, fastening device. These arresting surfaces additionally engage in the latching surfaces of latching arms on the module and fix the closure part ideally in the receiving socket. The closing of a multiplicity of different coupling locations is possible through the use of the arresting surfaces on the closure part and/or through the use of receiving surfaces located on the closure part.

Other features which are considered as characteristic for the invention are set forth in the appended claims.

Although the invention is illustrated and described herein as embodied in a closure part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a view similar to FIG. 3 of a closure part for two receiving sockets; and FIG. 5 is a view of the closure part of FIG. 4 as seen from the side.

DESCRIPTION OF THE PREFERRED EMBODIMENTS

Figure 1:
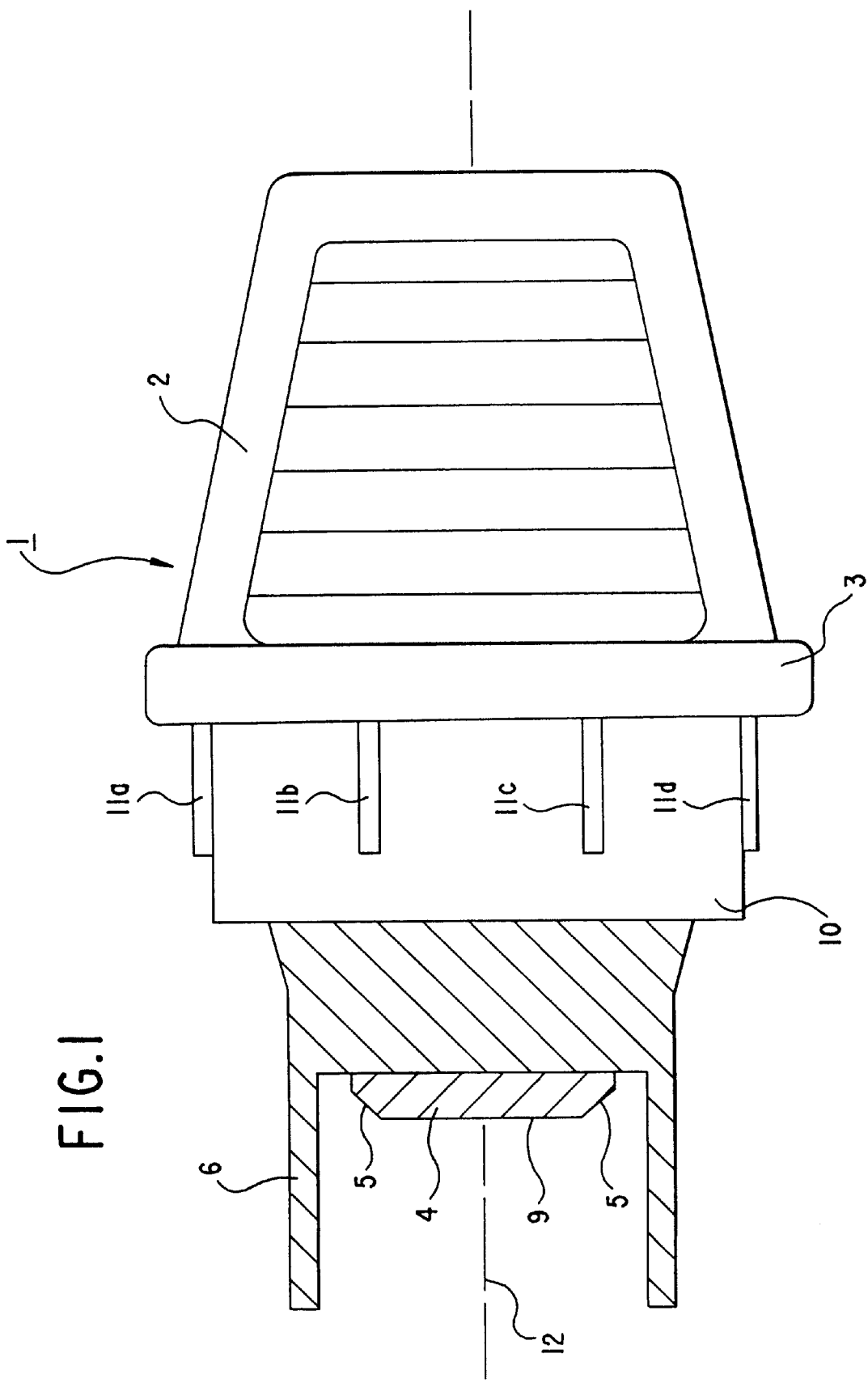
FIG. 1 is a diagrammatic, partly sectional and partly elevational view of a closure part according to the invention.

Referring now to the figures of the drawings in detail and first, particularly, to FIG. 1 thereof, there is seen a closure part 1 according to the invention, with a grip 2 and a stop flange 3 adjoining the grip 2. The flange 3 is adjoined by an approximately cross-sectionally rectangular basic body 10. The basic body 10 carries clamping ribs 11a–11d which begin at the stop flange 3 and are aligned parallel with respect to an axis 12 of the closure part. A part of the basic body 10 facing away from the stop flange 3 merges with a sleeve 6 having a circular cross-section. The sleeve 6 coaxially surrounds a central sealing element 4 with a bevel 5 at an end surface and projects beyond an end surface 9 of the sealing element 4. The bevel 5 is adapted in its surface area to an edging on an end surface of a socket on a coupling.

Figure 2:
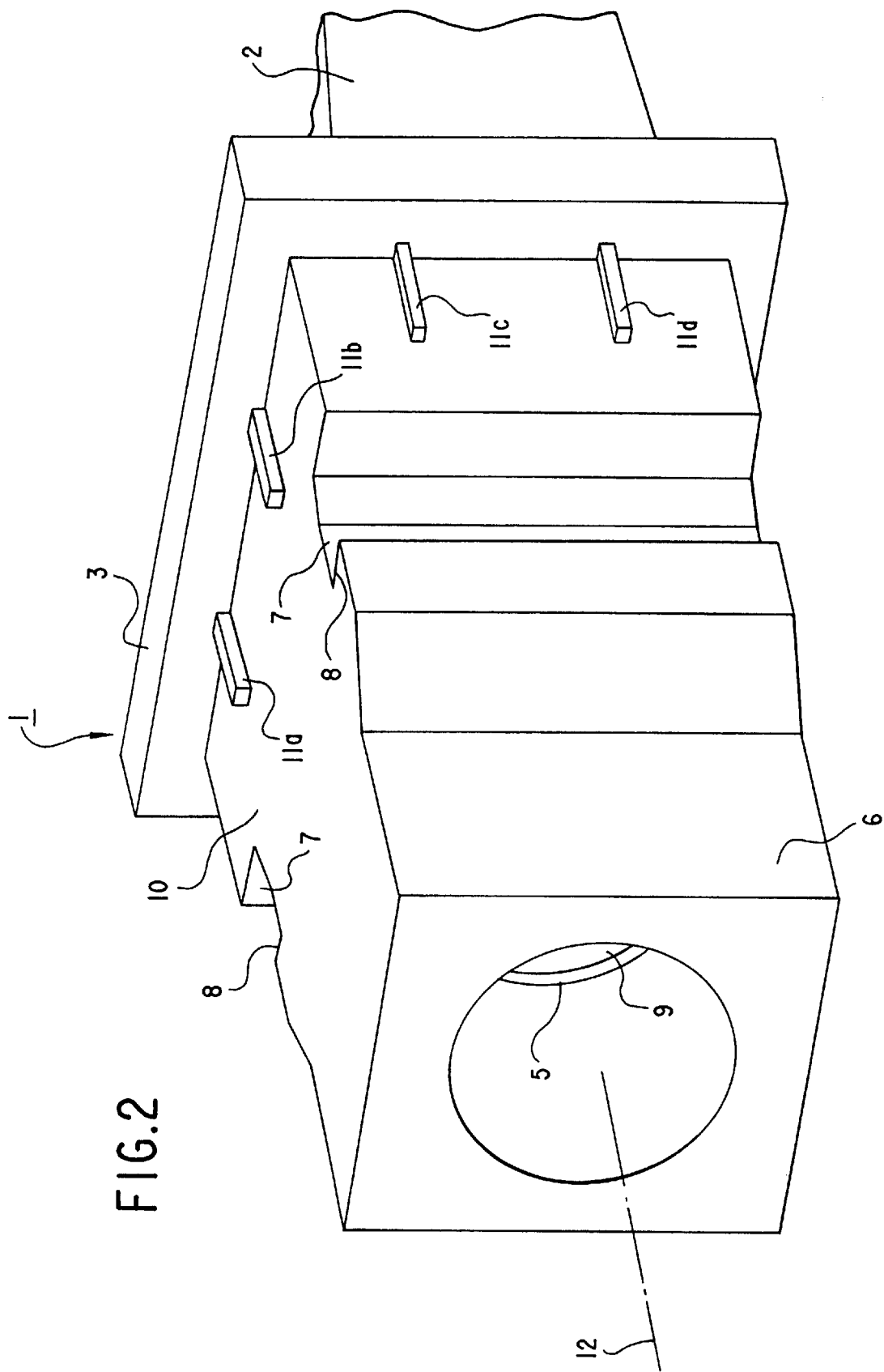
FIG. 2 is a fragmentary, perspective view of a further closure part according to the invention.

FIG. 2 perspectively represents a closure part according to the invention. The designations are identical to those of FIG. 1. The sleeve 6 is represented therein as having a rectangular outer cross-section in a front region, but may also have a different, in particular round, cross-section. The outer cross-section of the sleeve 6 may also vary in its structure. For example, a round or circular shaping in the front region of the sleeve 6 but an approximately rectan-gular shape for a rear region is advantageous. Depressions 7 begin in the basic body 10 and continue as far as the sleeve 6 on both sides for receiving latching arms on the coupling. The depressions 7 are bounded on one of their sides by receiving surfaces 8, running approximately perpendicular with respect to the axis 12 of the closure part. The receiving surfaces 8 permit an abutment of latching arms on the coupling and additionally stabilize the closure part 1.

Figure 3:
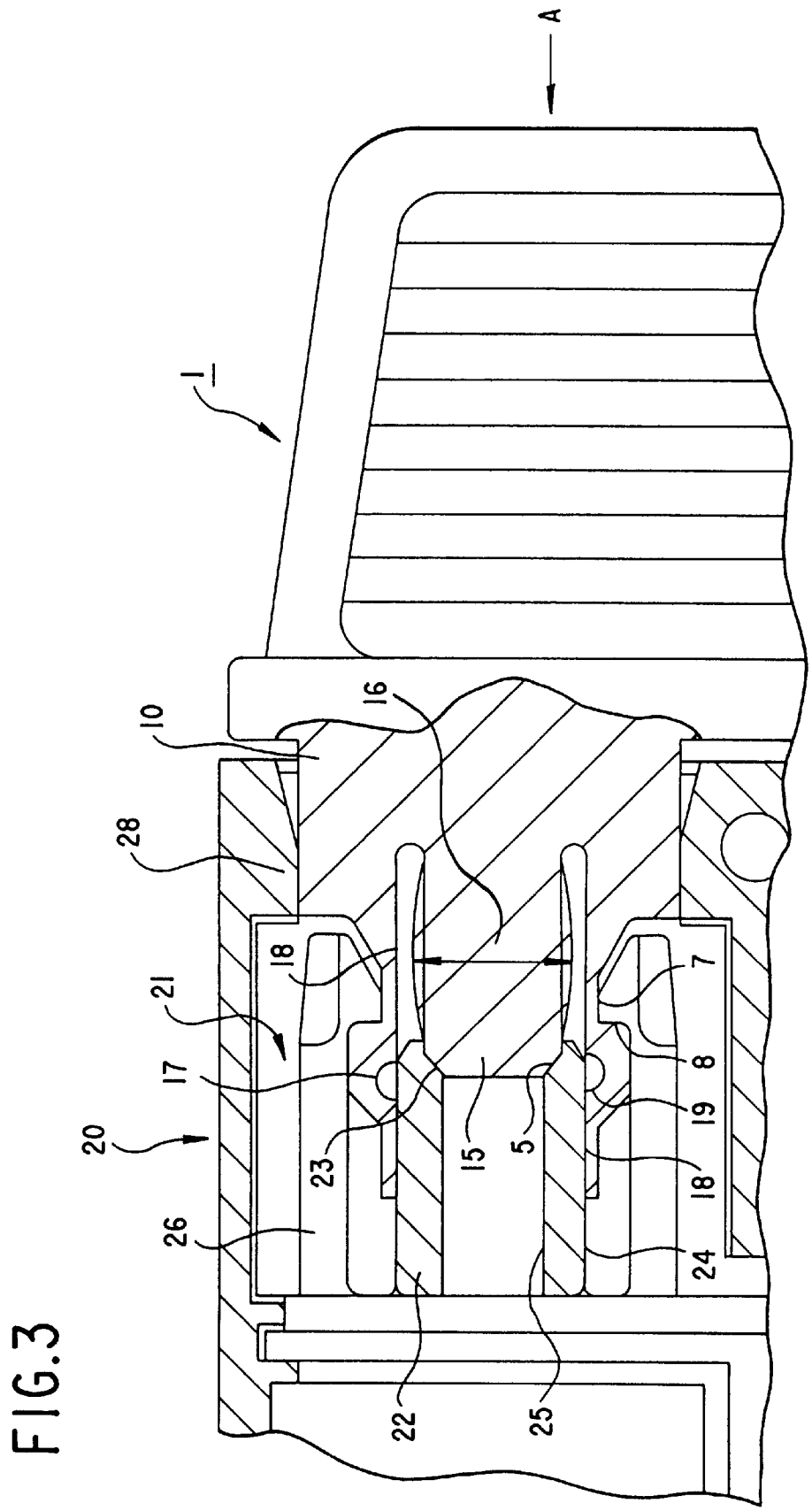
FIG. 3 is a fragmentary, partly broken-away and partly sectional view of a closure part according to the invention, which closes a coupling socket in an SC receptacle.

FIG. 3 illustrates a sealing effect of a closure part according to the invention. The closure part 1 has been inserted with a sleeve 18 and a sealing element 15 thereof into an SC receptacle 21 of an electrooptical module 20 and closes a coupling socket 22 for optical waveguides located in the receptacle 21. The sleeve 18 encloses an outer edging 24 of the socket 22 which is in close contact with it, and thereby fixes the closure part 1 in the SC receptacle 21 and seals the socket 22. The sealing effect is advantageously supplemented by the bevel 5 of the sealing element 15. Since the sealing element 15 does not protrude into the coupling socket 22, self-contamination by dirt particles adhering to the sealing element 15 is ruled out. An inner wall surface 25 of the socket 22, which serves for receiving an optical waveguide pin, is not touched and any depositing of dirt on the inner wall surface 25 is avoided.

The sealing element 15 is pressed against an edging 23 on an end surface of the socket under the influence of pressure A in the direction of the socket 22. As a result, optimum protection is achieved. The firmly adhering fit of the sleeve 18 on the outer edging or surface 24 of the socket 22 has the effect of transferring the pressure A to the sealing element or stopper 15. Latching arms which are latched into the depressions 7 and/or a clamping connection between non-illustrated clamping ribs of the basic body 10 that reach into the receptacle and a front edging 28 of the SC receptacle 21, or some other suitable fastening device, help to maintain the pressure A.

The pressure A in the direction of the socket 22 causes the sealing element 15, which is represented herein as a sealing stopper, to expand radially. The sleeve 18, which surrounds the stopper 15, leaves adequate space for a radial expansion 16. In contrast with the sleeve 6 represented in FIG. 1, a starting point of the sleeve 18 is drawn deeper into the basic body 10. The sealing stopper 15 is molded from an elastic plastic in one piece with the sleeve 18. A two-part construction of the stopper 15 and the sleeve 18 is likewise possible.

An advantageous development of the concept according to the invention is achieved by an additional sealing device 17 running around an inner wall surface 19 of the sleeve 18.

When the closure part 1 is used according to the invention, the sealing device 17 grips around the outer edging or surface 24 of the coupling socket 22. Apart from a more favorable sealing effect, the closure part 1 is additionally fixed radially. The sealing device 17 is advantageously constructed as a sealing ring fitted partially into the inner wall surface 19 of the sleeve 18.

FIG. 4 shows a closure part for two receiving sockets disposed next to one another. Arresting surfaces 40 which surround the sleeve 18 on two sides, are formed on the closure part 1. On one hand, since the arresting surfaces 40 at least partially bound the basic body 10, the clamping ribs 11a, 11b are disposed on an outer surface of the arresting surfaces 40. On the other hand, the clamping rib 11c is fastened on the basic body 10. The arresting surfaces 40 have projections 42 for the abutment of latching arms 26 on the module. The projections 42 are hidden in the figure. The projections 42 interact in a blocking manner with elevations 27 of the latching arms 26 on the module. The arresting surfaces 40 may be formed of the same material as and may form one part with, the basic body 10, or be molded from different materials as two parts.

In the broken-away representation of FIG. 4, the sleeve 18 and the sealing stopper 15 are represented once again. The stopper 15 is firmly pressed axially onto the socket 22 and expands in the radial direction 16 by pressure which is applied in this case by the sleeve, by the arresting of the latching arms 26 on the projections 42 of the arresting surfaces 40, by the receiving surfaces 8 of the depressions 7 and additionally by the clamping ribs 11a–11c.

FIG. 5 illustrates the interaction of the projections 42 of the arresting surfaces 40 with the elevations 27 of the latching arms 26. The arresting surfaces 40 are hooked together with the elevations 27 at a front edge 41 of the projections 42. The depressions 7 and the receiving surfaces 8 of the sleeve 18 are visible at the side, but only diagrammatically indicated. In addition, the closure part is held in the SC receptacle 21 by the pressing action of the clamping ribs 11a–11c. The coupling socket 22 is covered virtually completely by the latching arms 26. The component structure is chosen in such a way that the release of the closure part 1 from the receptacle 21 takes place with a reasonable expenditure of force and without material-fatiguing loading. The surfaces arresting one another are thereby separated from one another.

We claim:

1. A closure part, comprising:
a sleeve-shaped part for receiving an optical coupling socket and for snugly enclosing an outer surface of the socket; and
a central sealing element disposed coaxially in said sleeve-shaped part, said sealing element having an end surface with a bevel for producing a surface-area sealing contact with an end surface of the socket facing said sealing element;
said sleeve-shaped part protruding beyond said end surface of said sealing element.

2. The closure part according to claim 1, wherein said sealing element is formed of soft plastic.

3. The closure part according to claim 1, wherein said sealing element is a sealing stopper.

4. The closure part according to claim 1, including a basic body having outer surfaces, said sleeve-shaped part and said sealing element disposed on said basic body, and clamping ribs disposed on said outer surfaces of said basic body.

5. The closure part according to claim 4, wherein said sleeve-shaped part, said sealing element and said basic body are formed of one piece.

6. The closure part according to claim 4, wherein said sealing element, said sleeve-shaped part and said basic body are formed of different materials.

7. The closure part according to claim 4, including arresting surfaces adjoining said basic body for fixing the closure part.

8. The closure part according to claim 1, wherein said sleeve-shaped part and said sealing element are formed of one piece.

9. The closure part according to claim 1, wherein said sleeve-shaped part has an interior, and an additional sealing and guiding device is disposed in said interior.

10. The closure part according to claim 1, wherein said sleeve-shaped part has depressions with receiving surfaces for latching arms on the socket.

* * * * *